United States Patent
Oshida et al.

(10) Patent No.: US 6,374,183 B1
(45) Date of Patent: Apr. 16, 2002

(54) VEHICLE GUIDANCE METHOD FOR NAVIGATION SYSTEM

(75) Inventors: Naoya Oshida; Shigehito Takahashi, both of Tokyo (JP)

(73) Assignee: Alpine Electronics, Inc., Toyko (JP)

( * ) Notice: Subject to any disclaimer, the term of this patent is extended or adjusted under 35 U.S.C. 154(b) by 0 days.

(21) Appl. No.: 09/510,898

(22) Filed: Feb. 23, 2000

(30) Foreign Application Priority Data

Feb. 23, 1999 (JP) .......................................... 11-044629

(51) Int. Cl.$^7$ ........................... G01C 21/00; G06F 7/00; G06F 17/00; G06F 3/00; G06F 9/00; G06F 12/00; G06F 9/06; G06F 13/00; G06F 163/00; G06F 165/00

(52) U.S. Cl. ................. 701/211; 701/202; 701/205-210; 340/990; 340/995; 340/998; 340/996; 342/357; 342/457; 342/451; 364/449

(58) Field of Search ................................ 701/211, 210, 701/209, 208, 207, 206, 205, 202; 340/990, 995, 998, 996; 342/357, 457, 451; 364/449

(56) References Cited

U.S. PATENT DOCUMENTS

| | | | | |
|---|---|---|---|---|
| 5,303,159 A | * | 4/1994 | Tamai et al. ................. | 364/449 |
| 5,412,573 A | * | 5/1995 | Barnea et al. ............... | 364/449 |
| 5,452,121 A | * | 9/1995 | Yokoyama et al. ......... | 364/449 |
| 5,465,089 A | * | 11/1995 | Nakatani et al. ............ | 340/995 |
| 5,485,161 A | * | 1/1996 | Vaughn ....................... | 342/357 |
| 5,842,147 A | | 11/1998 | Nimura et al. .............. | 701/211 |
| 5,951,621 A | * | 9/1999 | Palalau et al. .............. | 701/200 |
| 5,974,357 A | * | 10/1999 | Poonsaengsathit et al. . | 701/210 |

\* cited by examiner

Primary Examiner—William A. Cuchlinski, Jr.
Assistant Examiner—Ronnie Mancho
(74) Attorney, Agent, or Firm—Brinks Hofer Gilson & Lione

(57) ABSTRACT

A navigation system provides route guidance to a destination even when a facility in an unmapped area is input as the destination. When a facility in an unmapped area is input as a destination, the navigation system obtains a guidance route to an appropriate freeway exit near the facility, thus guiding a vehicle along the guidance route. Subsequently, the navigation system displays an arrow indicating the direction from a vehicle position to the facility and a linear distance from the vehicle position to the facility, thus guiding the vehicle to the destination. The guidance is provided until the vehicle arrives at the destination.

17 Claims, 5 Drawing Sheets

FIG. 3

| FACILITY NAME | LOCATION DATA (LONGITUDE, LATITUDE) | FREEWAY EXIT (LONGITUDE, LATITUDE) | UNMAPPED AREA FLAG |
|---|---|---|---|
| ......... | ( ... , ... ) | | 0 |
| ......... | ( ... , ... ) | | 0 |
| ......... | ( ... , ... ) | ( ... , ... ) | 1 |
| ⋮ | ⋮ | ⋮ | ⋮ |
| ......... | ( ... , ... ) | | 0 |
| ......... | ( ... , ... ) | ( ... , ... ) | 1 |

VEHICLE GUIDANCE METHOD FOR NAVIGATION SYSTEM

BACKGROUND OF THE INVENTION

1. Field of the Invention

The present invention generally relates to a vehicle guidance method for a navigation system, and particularly relates to a vehicle guidance method for a navigation system when no road information around an input destination is detected.

2. Description of the Related Art

In a conventional navigation system for providing travelling guidance for a vehicle so that a driver of the vehicle can easily arrive at a desired destination, the vehicle position is detected and map data around the vehicle position is read from a CD-ROM or the like. A map image is displayed on a display screen on which a vehicle position mark (car mark) is displayed at a predetermined position. In accordance with changes in the current vehicle position caused by movement of the vehicle, the car mark on the screen is moved or the map is scrolled while the car mark is fixed at a predetermined position, such as the center of the image, thus instantly providing map information around the vehicle position.

The navigation system includes a route guidance function for setting a guidance route from a departure point to a destination, for displaying the guidance route on the map, and for giving guidance at intersections. When the departure point and the destination are input, a guidance route controller of the navigation system automatically determines the optimal guidance route and sequentially stores nodes (longitude, latitude) that form the guidance route in a guidance route memory. During travell, node strings stored in the guidance route memory are searched for the guidance route in a map display area on the screen. The guidance route is displayed so as to be discriminated from other roads. When the vehicle is within a predetermined distance from an approaching intersection, an intersection guidance image (an enlarged image of the intersection and an arrow indicating the direction of travel at the intersection) is displayed. The driver of the vehicle may thereby determine which road to take or which direction to take at the intersection.

When a facility in an unmapped area (a rural area in which only highways such as expressways are entered since not all data is mapped) is input as a destination in the conventional navigation system, a guidance route may not be searched for or guidance may be terminated at an inappropriate location due to a lack of road information around the destination. The navigation system fails to provide a user with information on the guidance route to the desired destination, causing inconvenience for the user.

BRIEF SUMMARY OF THE INVENTION

Accordingly, it is an object of the present invention to provide a navigation system for providing, by organizing correspondence between facilities and freeway exits near the facilities into a database, an appropriate freeway exit as a temporary destination even when a facility in an unmapped area is input as a destination, and for providing route guidance to the destination.

It is another object of the present invention to provide a navigation system for displaying a direction from a temporary destination (freeway exit) to a destination (facility) as an arrow or a line and for displaying a linear distance from the temporary destination to the destination, thus guiding a vehicle to the destination as a user desires.

To this end, according to the present invention, when no road information around an input destination is detected, a freeway exit near the destination is obtained as a temporary destination. The vehicle is guided to the temporary destination along a guidance route.

Correspondence between a facility, a location thereof, and a freeway exit may be organized into a database. When data is input to specify the facility as the destination, a freeway exit corresponding to the facility is obtained from the database.

When the vehicle arrives at the temporary destination, a display screen sequentially displays a line or an arrow indicating the direction from a vehicle position to the destination and a linear distance from the vehicle position to the destination. Therefore, the vehicle may be guided to the destination.

Specifically, even when a facility in an unmapped area is input as a destination, normal route guidance is provided until the vehicle arrives at the freeway exit near the facility. Subsequently, the navigation system guides the vehicle by displaying the arrow or the line and the distance to the destination, thus guiding the vehicle to the user's desired destination.

BRIEF DESCRIPTION OF SEVERAL VIEWS OF THE DRAWINGS

FIG. 3 is an illustration of a facility database;

DETAILED DESCRIPTION OF THE INVENTION

Figure 1:
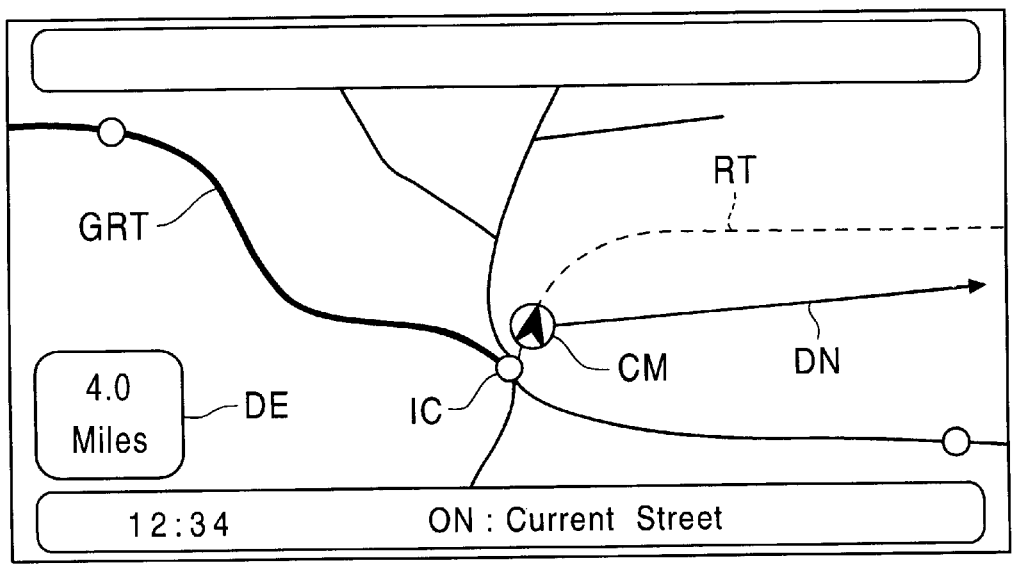
FIG. 1 is a schematic illustration of a navigation system according to an embodiment of the present invention.

FIG. 1 is a schematic illustration of a navigation system according to an embodiment of the present invention. FIG. 1 shows a guidance route GRT from a departure point to a freeway exit (interchange) IC, a vehicle position mark (car position mark) CM, an arrow DN indicating the direction from the vehicle position to the destination, a linear distance DE from the vehicle position to the destination, and a route RT to the destination which actually exists but is unavailable in the map data.

When a facility in an unmapped area is input as a destination, the navigation system obtains the guidance route GRT to the appropriate freeway exit IC near the facility, thus guiding a vehicle along the guidance route GRT.

Subsequently, the navigation system guides the vehicle from the freeway exit IC to the facility in the unmapped area by displaying the arrow DN that displays the direction from the vehicle position to the facility and the linear distance DE from the vehicle position to the facility. The display guidance is provided until the vehicle arrives at the destination.

Figure 2:
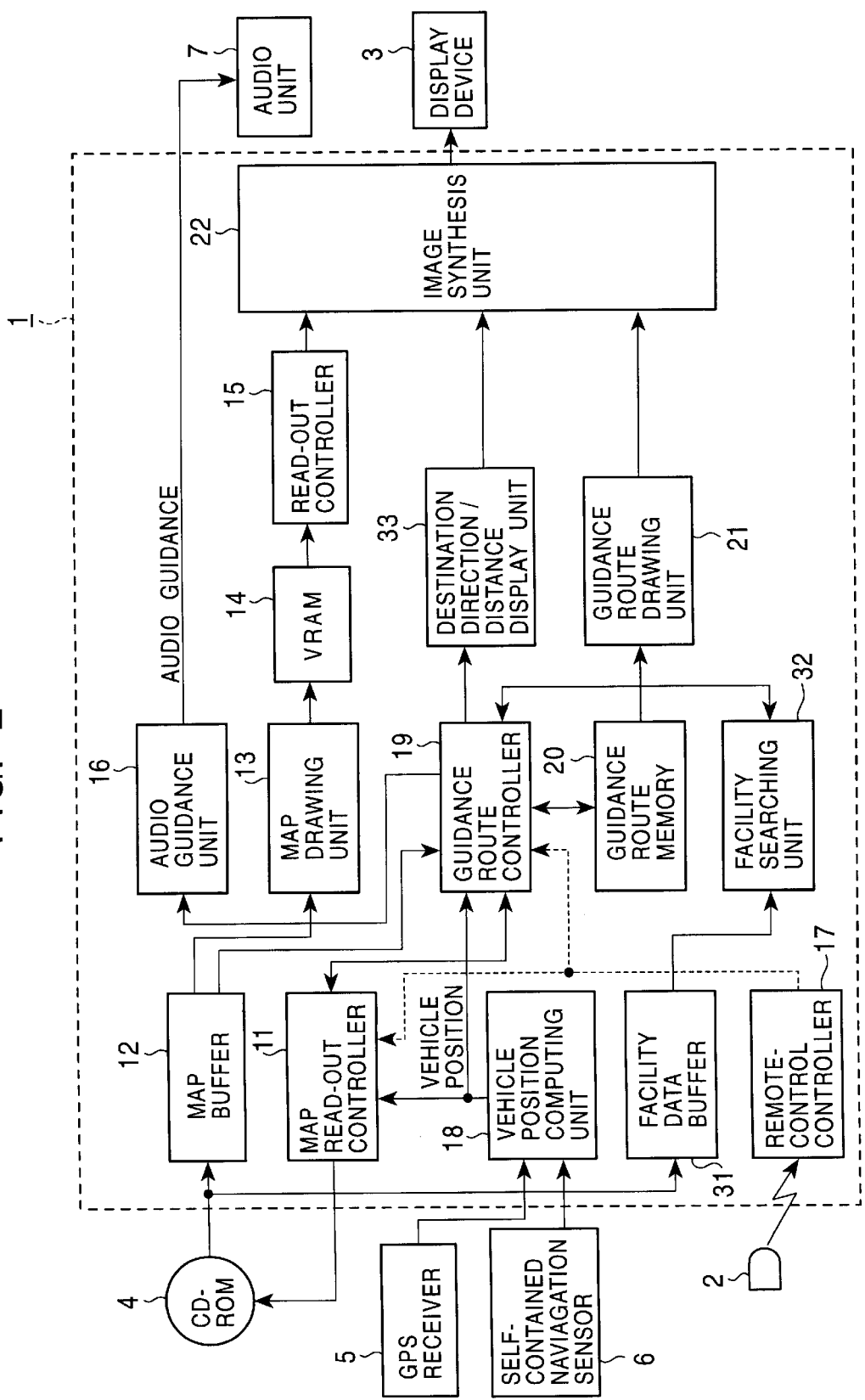
FIG. 2 is a block diagram of the navigation system shown in FIG. 1.

FIG. 2 is a block diagram of the overall navigation system. The navigation system includes a navigation controller 1, a remote control 2 for inputting various commands to the navigation controller 1, a display device 3 for displaying a map, a guidance route, and various menus, a storage medium 4 including a CD-ROM or a DVD-ROM for storing map information, a global positioning system (GPS) receiver 5 for receiving radio waves from a satellite and determining the current position and azimuth of the vehicle, a self-contained navigation sensor 6, and an audio unit 7 for outputting a guidance voice reporting that the vehicle has arrived at the destination or a guidance voice at intersections. The GPS receiver 5 computes the vehicle position and the azimuth by three-dimensional position fixing or two-dimensional position fixing, and outputs the computed vehicle position and the azimuth along with a position-fix time. The self-contained navigation sensor 6 includes a relative azimuth sensor (angle sensor) (not shown), such as a vibrating gyroscope, for detecting the rotation angle of the vehicle, and a distance sensor (not shown) for generating one pulse every predetermined distance traveled.

Map information stored in the CD-ROM 4 includes a map layer, a background layer for displaying objects on the map, a character layer for displaying characters, such as municipal names, an integrated information service (IIS) layer for storing IIS information, and a facility database.

Referring now to FIG. 3, the facility database includes the name of each facility, its location (longitude, latitude), a freeway exit (longitude, latitude), and a flag representing whether the facility is in an unmapped area (1 for unmapped area; 0 for mapped area). For a facility in an unmapped area, the most suitable freeway exit for accessing the facility is recorded.

Referring back to FIG. 2, the navigation controller 1 includes a map read-out controller 11 for computing a focus position (coordinate position at the center of a screen) when a map movement operation or a map selection operation is performed, for reading out predetermined map information from the CD-ROM 4 based on the vehicle position or the focus position and inputting the map information to a map buffer 12, and for reading out facility database information from the CD-ROM 4 and inputting the information to a facility data buffer 31.

The map buffer 12 stores the map information read from the CD-ROM 4. In order to scroll the map, a plurality of pieces (units) of map information around the vehicle position or the focus position, such as map information in 3×3 units, is read into the map buffer 12. A map drawing unit 13 generates a map image using the map information stored in the map buffer 12. A video RAM (VRAM) 14 stores the map image. A read-out controller 15 moves the map image, based on the screen center position, to the position for one screen cut-out by the VRAM 14, thus scrolling and displaying the map in accordance with changes in the vehicle position or cursor motion.

The navigation controller 1 further includes an audio guidance unit 16 for outputting, from the audio unit 7, a guidance voice reporting that the vehicle has arrived at the destination or a guidance voice at intersections, a remote-control controller 17 for receiving a signal in accordance with operations of the remote control 2 and instructing each unit, a vehicle position computing unit 18 for computing a vehicle position based on GPS data and self-contained navigation sensor output, a guidance route controller 19, a guidance route memory 20 for storing the guidance route, a guidance route drawing unit 21, and an image synthesis unit 22. The guidance route controller 19 performs normal guidance route computation processing, and guidance route processing (described hereinafter) when a facility in an unmapped area is input as a destination. In normal route guidance, the guidance route memory 20 stores location data on all nodes on a guidance route, computed by the guidance route controller 19, from the departure point to the destination. The guidance route drawing unit 21 reads out guidance route information (node strings) from the guidance route memory 20 and draws the guidance route discernibly on the map.

A facility data buffer 31 stores facility database information read from the CD-ROM 4. A facility searching unit 32 searches facility database information for a facility input as a destination and sends the facility information to the guidance route controller 19. A destination direction/distance display unit 33 displays, based on the information sent by the guidance route controller 19, an arrow or a line indicating the direction from the vehicle position to the destination and a linear distance from the vehicle position to the destination.

Figure 4:
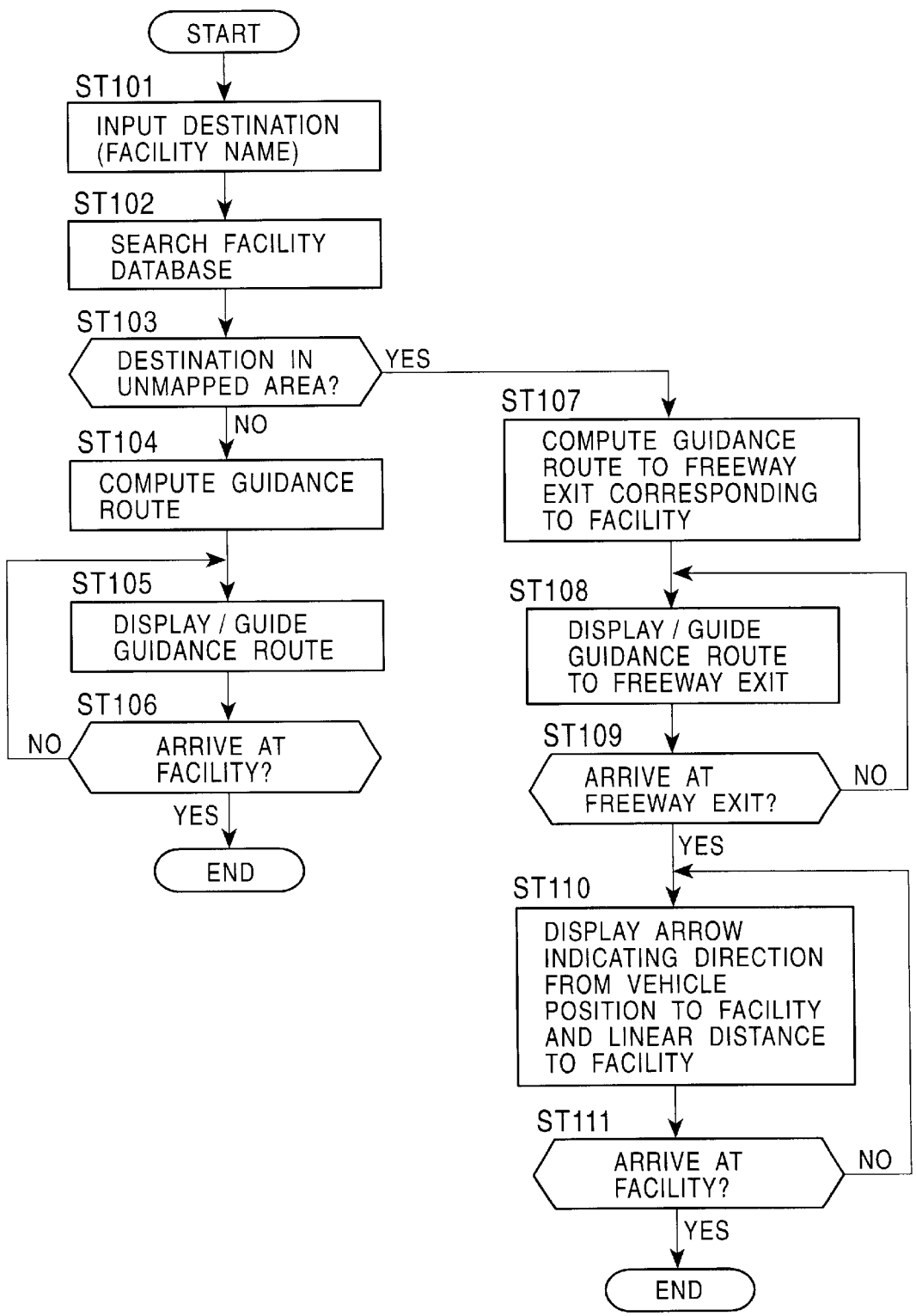
FIG. 4 is a flowchart describing a vehicle guidance process according to an embodiment of the present invention.

FIG. 4 is a flowchart describing a vehicle guidance process according to an embodiment of the current invention.

The remote control 2 is operated and a location name (destination) is input as desired by a user (step ST101). When the location name is input as the destination, the map read-out controller 11 reads out facility database information from the CD-ROM 4 and stores the information in the facility data buffer 31. In response to a request from the guidance route controller 19, the facility searching unit 32 searches the facility database information, stored in the facility data buffer 31, for the facility (step ST102) and outputs data on the detected facility to the guidance route controller 19. The guidance route controller 19 determines whether the facility is in an unmapped area by consulting the unmapped area flag of the facility data sent thereto (step ST103).

If the content of the flag is "0", i.e., if the destination is in a mapped area, the guidance route controller 19 computes a guidance route from the departure point to the destination (step ST104) and stores node strings (location data) forming the guidance route in the guidance route memory 20. Subsequently, the map drawing unit 13 displays a map around the vehicle position on the display device 3, and the guidance route drawing unit 21 displays the guidance route on the map so as to be discriminated from other roads.

The route guidance is thereby provided. As the vehicle travels, the map is scrolled and displayed, and the guidance route is displayed (step ST105). The guidance route controller 19 determines whether the vehicle has arrived at the node of the destination using the vehicle position input by the vehicle position computing unit 18 (step ST106). If the determination is affirmative, the route guidance process is terminated. If the determination is negative, the process continues to display the guidance route for guiding the vehicle until the vehicle arrives at the destination.

If the content of the flag is "1" in step ST103, i.e., if the destination is in an unmapped area, the guidance route controller 19 assumes a freeway exit corresponding to the facility as a temporary destination and computes a guidance route from the departure point to the freeway exit (step ST107). The guidance route controller 19 stores node strings forming the guidance route in the guidance route memory 22. Subsequently, the map drawing unit 13 displays a map around the vehicle position on the display device 3. The guidance route drawing unit 21 displays the guidance route on the map so as to be discriminated from other roads.

The route guidance from the departure point to the freeway exit is thereby provided. As the vehicle travels, the map is scrolled and displayed, and the guidance route is displayed for guiding the vehicle (step ST108). The guidance route controller 19 determines whether the vehicle has arrived at the freeway exit using the vehicle position input by the vehicle position computing unit 18 (step ST109). If the determination is negative, the process continues to display the guidance route until the vehicle arrives at the freeway exit. If the vehicle arrives at the freeway exit, the route guidance to the freeway exit is terminated. The guidance route controller 19 outputs the vehicle position input by the vehicle position computing unit 18 and location data on the destination (desired facility) to the destination direction/distance display unit 33. Based on the vehicle position and the location data on the destination sent from the guidance route controller 19, the destination direction/distance display unit 33 generates an arrow image indicating the direction from the vehicle position to the destination and linear distance data from the vehicle position to the destination. The arrow image and the linear distance data are sequentially displayed on the display device 3, as shown in FIG. 1 (step ST110).

The guidance route controller 19 determines whether the vehicle has arrived at the destination using the vehicle position input by the vehicle position computing unit 18 (step ST111). If the determination is negative, the destination direction/distance display unit 33 continues to display the arrow indicating the direction from the vehicle position to the destination and the linear distance from the vehicle position to the destination for guiding the vehicle until the vehicle arrives at the destination. If the vehicle arrives at the destination, the guidance route controller 19 terminates sending of data to the destination direction/distance display unit 33. The route guidance process is thereby terminated.

Although the present invention has been described in the context of a map-display navigation system, the present invention is applicable to an arrow-display navigation system in which no map image is displayed on a display device and a vehicle is guided with an arrow display.

Figure 5:
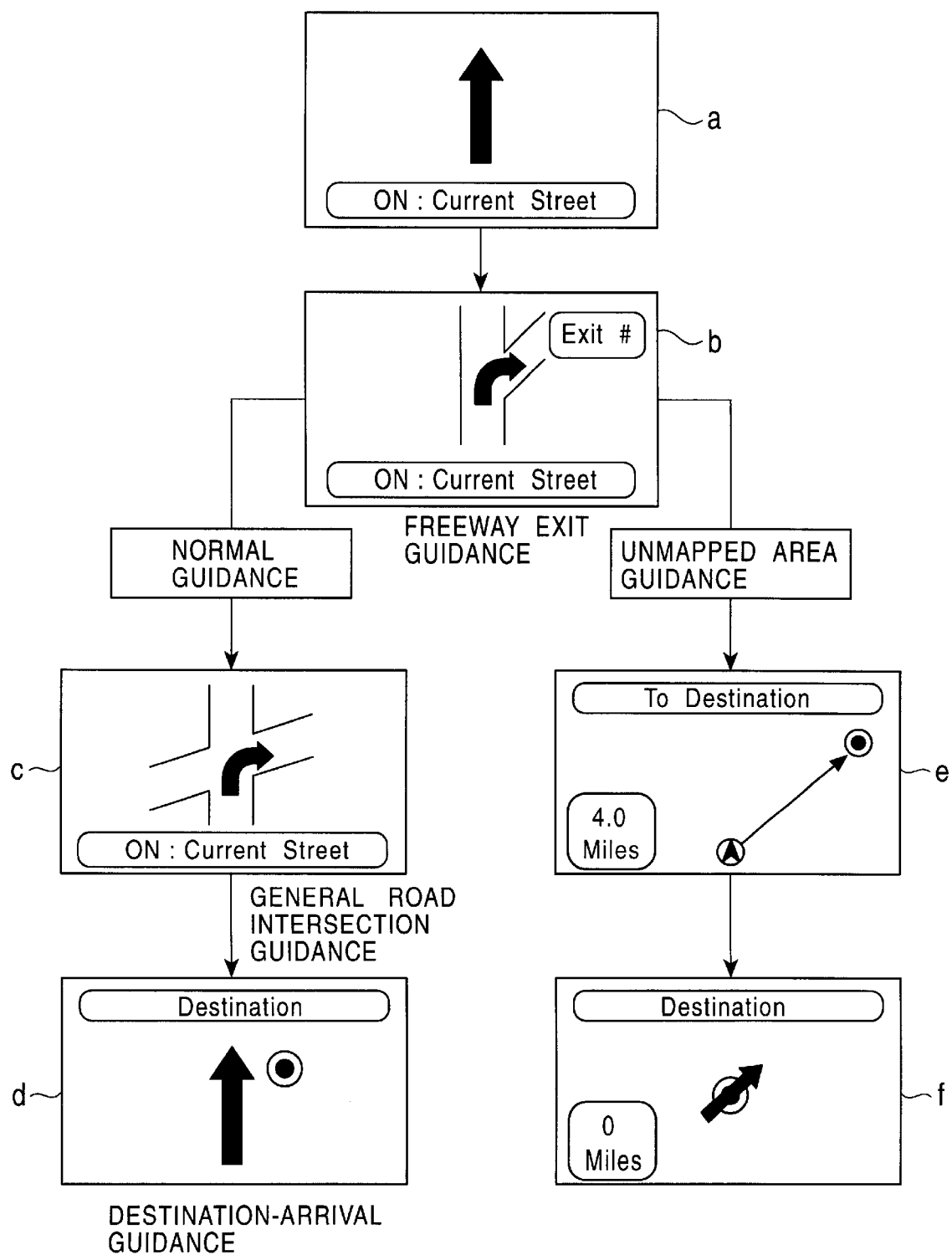
FIG. 5 includes examples of display screens of an arrow-display navigation system to which the present invention is applied.

FIG. 5 shows examples of display screens when the present invention is applied to the arrow-display navigation system. When road information around an input destination is detected, a guidance route to the destination is shown with a normal arrow display, as shown in screens a, b, c, and d in FIG. 5.

When the destination is in an unmapped area, a freeway exit corresponding to the destination is obtained, and the normal route guidance is provided from the departure point to the freeway exit, as shown in screens a and b in FIG. 5. Subsequently, the vehicle guidance from the freeway exit to the destination in the unmapped area is provided by displaying an arrow indicating the destination from a vehicle position to the destination and a linear distance from the vehicle position to the destination, as shown in screens e and f in FIG. 5. The guidance is displayed until the vehicle arrives at the destination.

What is claimed is:

1. A vehicle guidance method for a navigation system for guiding a vehicle along a guidance route during traveling of the vehicle to a destination identified by a user, the method comprising:

providing stored road information for mapped areas;

obtaining, when the identified destination is in an unmapped area so that no stored road information around the identified destination is available for route guidance, a freeway exit near the identified destination as a temporary destination in a mapped area;

guiding the vehicle along the guidance mute to the temporary destination; and thereafter providing an Indication of the straight line direction from the vehicle position to the identified destination.

2. A vehicle guidance method for a navigation system according to claim 1, the method further comprising:

organizing correspondence between a facility, a location thereof, and a freeway exit into a database; and inputting data for designating the facility as the destination and obtaining the freeway exit corresponding to the facility from the database.

3. A vehicle guidance method for a navigation system according to one of claims 1 and 2, the method further comprising:

displaying, after the vehicle has arrived at the temporary destination, a line indicating the direction from a vehicle position to the destination on a display screen; and guiding the vehicle to the destination.

4. A vehicle guidance method for a navigation system according to one of claims 1 and 2, the method further comprising:

displaying, after the vehicle has arrived at the temporary destination, an arrow indicating the direction from a vehicle position to the destination on a display screen; and guiding the vehicle to the destination.

5. A vehicle guidance method for a navigation system according to one of claims 1 and 2, the method further comprising:

displaying, after the vehicle has arrived at the temporary destination, one of a line and an arrow indicating the direction from a vehicle position to the destination and a linear distance from the vehicle position to the destination on a display screen; and guiding the vehicle to the destination.

6. A vehicle guidance method for a navigation system for guiding a vehicle along a guidance route during traveling of the vehicle to a destination identified by a user, the method comprising:

providing stored road information for mapped areas;

obtaining, when the identified destination is in an unmapped area so that no stored road information around the identified destination is available for route guidance, a freeway exit near the identified destination as a temporary destination in a mapped area;

guiding the vehicle along the guidance route to the temporary destination; and thereafter providing an indication of the straight line direction from the vehicle position to the input destination;

the method further comprising organizing a facility, a location thereof, information on whether the facility is in an unmapped area, and a freeway exit corresponding to the facility into a database; and obtaining, when the facility in an unmapped area is identified as the destination, a freeway exit corresponding to the facility from the database.

7. A vehicle guidance method for a navigation system according to claim 6, the method further comprising:

displaying, after the vehicle has arrived at the temporary destination, a line indicating the direction from a vehicle position to the destination on a display screen; and guiding the vehicle to the destination.

8. A vehicle guidance method for a navigation system according to claim 6, the method further comprising:
displaying, after the vehicle has arrived at the temporary destination, an arrow indicating the direction from a vehicle position to the destination on a display screen; and
guiding the vehicle to the destination.

9. A vehicle guidance method for a navigation system according to claim 6, the method further comprising:
displaying, after the vehicle has arrived at the temporary destination, one of a line and an arrow indicating the direction from a vehicle position to the destination and a linear distance from the vehicle position to the destination on a display screen; and
guiding the vehicle to the destination.

10. A navigation system for providing guidance in accordance with a searched route, comprising:
input means for identifying a destination;
position detecting means for detecting a current position of a vehicle;
storage means for providing stored road information for mapped areas and organizing correspondence between a facility, a location thereof, and a freeway exit into a database;
guidance route control means for searching for, based on the stored road information in said storage means, a route from the vehicle position detected by said position detecting means to the destination identified through said input means; and
display means for displaying the route searched for by said guidance route control means;
wherein said guidance control means obtains, when no stored road information around the destination identified through said input means is available for route guidance, a freeway exit near the destination as a temporary destination, and guides the vehicle along a guidance route to the temporary destination.

11. A navigation system according to claim 10, further comprising a means for displaying, after the vehicle has arrived at the temporary destination, an arrow indicating the direction from the vehicle position to the destination.

12. A navigation system according to claim 10, further comprising a means for displaying, when the vehicle has arrived at the temporary destination, a line indicating the direction from the vehicle position to the destination.

13. A navigation system according to claim 10, further comprising a destination direction/distance display means for displaying, after the vehicle has arrived at the temporary destination, one of a line and an arrow indicating the direction from the vehicle position to the destination and a linear distance from the vehicle position to the destination.

14. A navigation system for providing guidance in accordance with a searched route, comprising:
input means for identifying a destination;
position detecting means for detecting a current position of a vehicle;
storage means for providing stored road information for mapped areas and organizing a facility, a location thereof, information on whether the facility is in an unmapped area, and a freeway exit near the facility into a database; and
guidance route control means for searching for, based on the stored road information in said storage means, a route from the vehicle position detected by said detecting means to the destination identified through said input means;
wherein said guidance control means obtains, when the destination identified through said input means is in an unmapped area, a freeway exit near the facility as a temporary destination and obtains a guidance route to the temporary destination.

15. A navigation system according to claim 14, further comprising a means for displaying, after the vehicle has arrived at the temporary destination, an arrow indicating the direction from the vehicle position to the destination.

16. A navigation system according to claim 14, further comprising a means for displaying, after the vehicle has arrived at the temporary destination, a line indicating the direction from the vehicle position to the destination.

17. A navigation system according to claim 14, further comprising a destination direction/distance display means for displaying, after the vehicle has arrived at the temporary destination, one of a line and an arrow indicating the direction from the vehicle position to the destination and a linear distance from the vehicle position to the destination.

* * * * *